United States Patent [19]

Jeong et al.

[11] Patent Number: 5,525,677
[45] Date of Patent: Jun. 11, 1996

[54] COMPOLYMER OF STYRENE AND SILANE COUPLING AGENT AND SYNTHESIZING METHOD THEREOF AND METHOD FOR IMPROVING ADHESION PERFORMANCE IN FIBER REINFORCED POLYSTYRENE COMPOSITES BY USING THE COMPOLYMERS

[75] Inventors: Jongkoo Jeong, Sungnam; Jyongsik Jang; Junyup Lee, both of Seoul, all of Rep. of Korea

[73] Assignee: Dongbu Chemical Co., Ltd., Seoul, Rep. of Korea

[21] Appl. No.: 424,560

[22] Filed: Apr. 17, 1995

Related U.S. Application Data

[63] Continuation of Ser. No. 219,678, Mar. 29, 1994, abandoned.

[30] Foreign Application Priority Data

Nov. 15, 1993 [KR] Rep. of Korea ............... 93-24200
Mar. 4, 1994 [KR] Rep. of Korea ............... 94-4224

[51] Int. Cl.$^6$ ............................................. C08L 25/02
[52] U.S. Cl. ............................................. 525/241
[58] Field of Search ................................. 525/241

[56] References Cited

U.S. PATENT DOCUMENTS

| | | |
|---|---|---|
| 4,316,041 | 2/1982 | Totten et al. |
| 4,351,910 | 9/1982 | Sugitani et al. |
| 4,948,832 | 8/1990 | Ostermayer et al. |
| 4,961,976 | 10/1990 | Hashimoto et al. |
| 5,039,719 | 8/1991 | Watanabe ............... 523/213 |
| 5,179,137 | 1/1993 | Okamato ............... 523/213 |
| 5,214,095 | 5/1993 | Lavoie. |

OTHER PUBLICATIONS

Horák, Z. "Modification of the Strength Characteristics" in Styrene-Based Plastics and their Modification, Ellis Horwood Series in Polymer Science and Technology, pp. 320–332.

*Primary Examiner*—Joseph L. Schofer
*Assistant Examiner*—N. Sarofim
*Attorney, Agent, or Firm*—Ladas & Parry

[57] ABSTRACT

Novel agents for improving adhesion performance between fibers and resins in fiber reinforced polystyrene composites and synthesizing method thereof and method for improving adhesion performance in fiber reinforced polystyrene composites by using the copolymers are disclosed.

The agents are copolymers of styrene and silane coupling agents, and the copolymers can be manufactured by copolymerizing styrene monomer and silane coupling agents in benzene solvent at nitrogen atmosphere by employing azobisisobutyronitrile (AIBN) and the like as an initiator after purifying the reactants and eliminating polymerization inhibitor from the reactants.

The typical copolymer is poly(styrene-co-γ-MPS)(γ-MPS means γ-methacryloxypropyltrimethoxysilane) which is manufactured by copolymerizing styrene monomer and γ-MPS.

Adhesion performance of the polystyrene fiber composites is improved by hydrolyzing the copolymer in the presence of solvent and applying the copolymer to the surface of the fibers for reinforcing and then immersing the fibers into polystyrene resin composition after drying.

Fiberglass materials are most preferably employed as fibers for reinforcing.

Adhesion performance between the fibers and matrix resin is substantially improved, resulting in enhanced the strength and endurance of the composite.

6 Claims, No Drawings

COMPOLYMER OF STYRENE AND SILANE COUPLING AGENT AND SYNTHESIZING METHOD THEREOF AND METHOD FOR IMPROVING ADHESION PERFORMANCE IN FIBER REINFORCED POLYSTYRENE COMPOSITES BY USING THE COMPOLYMERS

This is a continuation of application Ser. No. 08/219,678 filed on Mar. 29, 1994, now abandoned.

BACKGROUND OF THE INVENTION

1) Field of the Invention

The present invention relates to novel agents for improving adhesion performance between fibers and resins in fiber reinforced polystyrene composites, and more particularly to novel copolymers of styrene and silane coupling agents and a synthesizing method thereof and a method for improving adhesion performance in fiber reinforced polystyrene composites by using the copolymers.

2) Description of the Related Art

It is well known that fiber reinforced composites have been widely used for developing strength and heat resistance of conventional plastic materials. As a fiber material for reinforcing, glass fiber is most widely used because it is cheap and has relatively high mechanical strength and heat-resistance. Such glass fiber reinforced composites are used as a material of office supplies, automobile components, bath, water tank, home appliances and so on (George Lubin, Handbook of composites, p 133, 1982)

But, in such composite materials, there has been an interphase separation phenomenon in the interphase region due to low bonding ability between fibers and resins, thereby resulting in the physical deterioration of the properties of products (Lief A. Carlsson) Thermoplastic Materials, p 68, 1991)

To solve the above-said problem, it has been suggested that the surface of the fiber glass strands or chops be modified by a silane coupling agent so as to improve the adhesion performance between fibers and resins.(Petr. svcc, et al., Styrene Based Plastics and Their Modification, p 323, 1991). However, according to this method, the adhesion performance is not sufficiently improved due to the absence of functional groups to incorporate with matrix resin.

The inventors have solved the above-mentioned problem, by synthesizing a new copolymer of styrene and silane coupling agents which substantially improves adhesion performance between fibers and matrix resin.

SUMMARY OF THE INVENTION

It is an object of the present invention to provide a novel copolymer of styrene and silane coupling agent as an adhesion performance promoter that protects against interphase separation in fiber reinforced polystyrene composites.

It is another object of the present invention to provide a method for synthesizing the copolymer.

It is a still further object of the present invention to provide a method for using the copolymer for enhancing reactivity between the fibers and the matrix resin in the fiber reinforced polystyrene composites.

The copolymer of the present invention has the general formula (I) as follows.

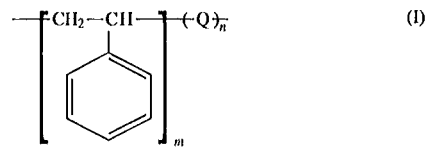

wherein m and n are any natural numbers, and Q represents any silane coupling agent, preferably γ-methacryloxy propyltrimethoxy silane (hereinafter termed "γ-MPS") having the following structural formula (II).

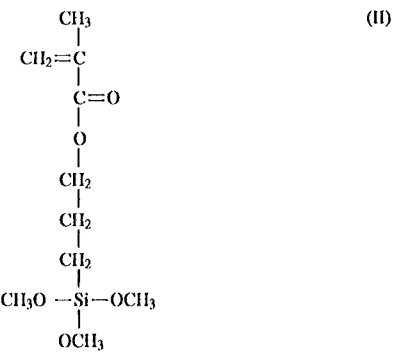

The copolymer of the present invention can be manufactured by copolymerizing styrene monomer and silane coupling agent in benzene solvent with nitrogen atmosphere by employing azobisisobutyronitrile (hereinafter termed "AIBN") and the like as an initiator after reactants are purified and polymerization inhibitor is eliminated from the reactants.

According to another aspect of the present invention, the copolymer is hydrolyzed in the presence of a solvent and then applied to the surface of the fiber strands or chops for reinforcing. Next, the fiber strands or chops are dried, immersed into polystyrene resin, and molded to a composite material, thereby substantially improving the adhesion performance between the fibers and polystyrene matrix resin of the composite.

The present invention will now be described in more detail below.

DESCRIPTION OF THE PREFERRED EMBODIMENT

The copolymer of the present invention has the general formula (I) as follows.

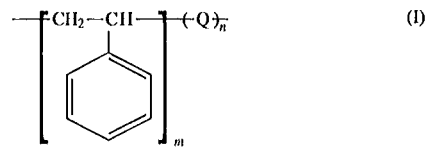

wherein m and n are any natural numbers, and Q represents any silane coupling agent, preferably γ-metacryloxy propyltrimethoxy silane (hereinafter termed "γ-MPS") having the following structural formula (II).

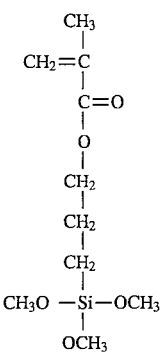

(II)

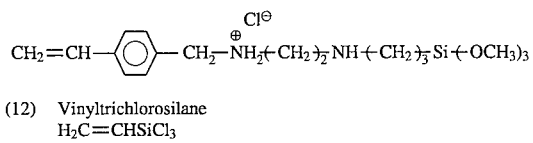

Q can also be any silane coupling agent with one or more carbon-carbon double bonds, for example, vinyltriethoxysilane, vinyltrimethoxysilane, vinyl triacetoxysilane, 3-methacryloxypropyltrichlorosilane, 3-methacryloxypropyl trimethoxy silane, 2-methacryloxyethyldimethyl(3-trimethoxysilylpropyl)ammoniumchloride, allyltrimethoxysilane, allyltriethoxysilane, 3 - acryloxypropyltri methoxysilane, 3-(N-styrylmethyl-2-amino-ethylamino)propyltrimethoxysilane hydrochloride, vinyltri chlorosilane as well as γ-MPS.

The chemical or structural formulas of the abovementioned silane coupling agents are as follows.

(1) γ-MPS $$CH_2=C(CH_3)-C(=O)-O-CH_2-CH_2-CH_2-Si(OCH_3)_3$$

(with CH₃O—Si—OCH₃ / OCH₃)

(2) Vinyltriethoxysilane
H₂C=CHSi(OCH₂CH₃)₃

(3) Vinyltrimethoxysilane
H₂C=CHSi(OCH₃)₃

(4) Vinyltriacetoxysilane
H₂C=CHSi(OOCH₂CH₃)₃

(5) 3-methacryloxypropyltrichlorosilane
H₂C=C(CH₃)COO(CH₂)₃SiCl₃

(6) 3-methacryloxypropyltrimethoxysilane
H₂C=C(CH₃)COO(CH₂)₃Si(OCH₃)₃

(7) 2-methacryloxyethyldimethyl(3-trimethoxysilylpropyl)ammoniumchloride $$CH_2=C(CH_3)-C(=O)-O-(CH_2)_2-\overset{\oplus}{N}(CH_3)_2-(CH_2)_3-Si(OCH_3)_3 \quad Cl^{\ominus}$$

(8) Allyltrimethoxysilane
H₂C=CHCH₂Si(OCH₃)₃

(9) Allyltriethoxysilane
H₂C=CHCH₂Si(OCH₂CH₃)₃

(10) 3-acryloxypropyltrimethoxysilane
H₂C=CHCOO(CH₂)₃Si(OCH₃)₃

(11) 3-(N-styrylmethyl-2-aminoethylamino)propyl-trimethoxysilanehydrochloride $$CH_2=CH-\text{C}_6\text{H}_4-CH_2-\overset{\oplus}{NH_2}-(CH_2)_2-NH-(CH_2)_3-Si(OCH_3)_3 \quad Cl^{\ominus}$$

(12) Vinyltrichlorosilane
H₂C=CHSiCl₃

The copolymer of the present invention can be manufactured by the following method.

Firstly, styrene, which is available commercially is washed by sodium hydroxide and water in order to eliminate polymerization inhibitor, and then distilled at about 5 to 15 torr and about 30° to 50° C. in order to remove water and impurities. Thus, styrene for copolymerization is prepared.

Next, γ-MPS, which is also available commercially is distilled at about 1 to 10 torr and about 60° to 90° C. in order to eliminate polymerization inhibitor and impurities, thereby being prepared for polymerization.

Any silane coupling agent with one or more carbon-carbon double bonds, for example, vinyltriethoxysilane, vinyltrimethoxysilane, vinyltriacetoxysilane, 3-methacryloxy propyltrichlorosilane, 3-methacryloxypropyltrimethoxysilane, -methacryloxyethyldimethyl(3-trimethoxysilylpropyl)ammonium chloride, allyltrimethoxysilane, allyltriethoxy silane, 3-acryloxypropyltrimethoxysilane, 3-(N-styrylmethyl-2-amino-ethylamino)propyltrimethoxy silane hydrochloride, vinyltrichlorosilane can be employed instead of the γ-MPS.

Next, AIBN is precipitated after being dissolved in methanol at about 30° C., thereby being prepared as a initiator for polymerization. General initiator like benzoylperoxide(BPO) can also be used instead of AIBN.

The purified styrene and γ-MPS are copolymerized in benzene at a nitrogen atmosphere at about 50° to 90° C. for about 4 to 10 hours. Upon copolymerizing, the concentration of styrene and γ-MPS are respectively about 1 to 5 mole/l, and the concentration of AIBN is $1\times10^{-3}$ mole/l or below the mole fraction of silane coupling agent to styrene can vary from 1.0:99.0 to 40:60. In this monomer, the copolymer of the present invention, poly (styrene-co-γ-MPS), can be synthesized.

The copolymer is applied to the surface of fiber chops or strands for reinforcing after being hydrolyzed in the presence of solvent, and dried at about 100° to 250° C. The reaction mechanism of the hydrolysis of the copolymer is as follows.

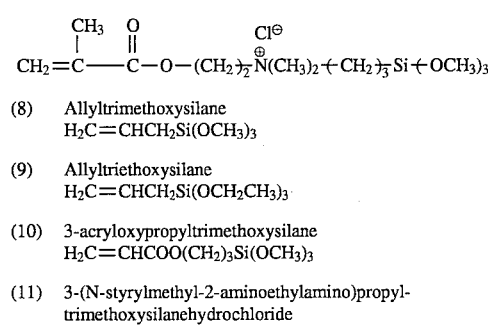

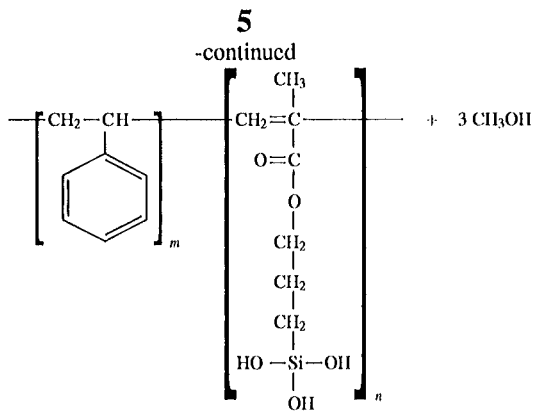

It is preferable that the concentration of the copolymer in the solvent is about 0.005 to 5.0 weight %.

Next, the fiber chops or strands are immersed into diluted polystyrene composition after being dried at room temperature, and then a molding procedure is performed to fabricate the composite material. At this time, the molding pressure and temperature are preferably respectively about 3 to 20 atm. and about 150° to 280° C.

The copolymer of silane coupling agent and styrene plays an important role in enhancing the adhesion performance between the fibers and the polystyrene resin in the composite martial by forming an interlayer. At this time, the silane parts in the copolymer form hydrogen bonds and covalent bonds with the fibers, and the styrene parts in the copolymer improve the compatibility with the polystyrene resin.

According to the present invention, the fibers for reinforcing are preferably fiberglass woven fabrics or fiberglass chops, most preferably heat-treated fiberglass materials. Further, it is easily understandable that any other resin materials can be used instead of polystyrene.

The following examples further elucidate the present invention, but the examples are offered by way of illustration only and not as a limitation.

EXAMPLE 1

Fiberglass fabrics (10 cm×10 cm) were woven of heat-treated fiberglass strands, and dried at an atmospheric pressure and 150° C. for 6 hours.

On the other hand, styrene was washed by sodium hydroxide and water in order to eliminate polymerization inhibitor, and then water and impurities were distilled off at 10 torr and 40° C.

Further, γ-MPS was distilled at about 1 torr and 80° C. in order to eliminate polymerization inhibitor and impurities, thereby being prepared for polymerization.

After that, AIBN was reprecipitated after being dissolved in methanol at 30° C., thereby being prepared as a initiator for polymerization.

The styrene, γ-MPS and AIBN are all of general grade and available at the present marcket.

The purified styrene and γ-MPS were copolymerized in benzene at about 70° C. for 5 hours by using AIBN as an initiator. Upon the copolymerizing, concentrations of styrene and γ-MPS were respectively 3 mole/l, the concentration of AIBN was $5 \times 10^{-4}$ mole/l and the mole fraction of silane coupling agent to styrene was 2.5:97.5. In this manner the copolymer of the present invention was synthesized.

The copolymer was applied to the surface of woven fiberglass strands for reinforcing after being hydrolyzed at pH 3.5 for 1 hour and diluted by 0.025 to 0.5 weight % in the solution.

Further, the treated fiberglass fabrics were immersed in polystyrene resin composition diluted in THF(Tetrahydrofuran) to make prepregs, and then the composites were fabricated in 12 prepreg plies and molded at 5 atm. and 240° C. for 10 minutes by a hot-press machine so as to form the final composite material.

Flexural strengths were measured by using Instron according to ASTM D 2344 method in order to evaluate the adhesion performance of the resulting composites. The sample was 10 mm in width and 15 mm in gage length. The adhesion performance improving rates are given below with reference to a flexural strength of composite untreated by the copolymer of the invention of 100. <Table 1> shows the results of the evaluation.

TABLE 1

| Concentration of the copolymer (wt %) | Flexural strength (MPa) | Adhesion performance improving rate (%) |
|---|---|---|
| 0.025 | 22.65 | 126 |
| 0.050 | 25.09 | 139 |
| 0.10 | 25.89 | 144 |
| 0.20 | 26.64 | 148 |
| 0.50 | 25.81 | 143 |

EXAMPLE 2

Experiment was carried out by the same method as example 1 except that the mole fraction of silane coupling agent to styrene was 5.0:95.0.

The results are shown in <Table 2>.

TABLE 2

| Concentration of the copolymer (wt %) | Flexural strength (MPa) | Adhesion performance improving rate (%) |
|---|---|---|
| 0.025 | 25.65 | 143 |
| 0.050 | 26.68 | 148 |
| 0.10 | 27.88 | 155 |
| 0.20 | 26.31 | 146 |
| 0.50 | 25.72 | 143 |

EXAMPLE 3

Experiment of carried out by the same method as example 1 except that the mole fraction of silane coupling agent to styrene was 7.5:92.5.

The results are shown in <Table 3>.

TABLE 3

| Concentration of the copolymer (wt %) | Flexural strength (MPa) | Adhesion performance improving rate (%) |
|---|---|---|
| 0.025 | 26.34 | 146 |
| 0.050 | 28.42 | 158 |
| 0.10 | 27.56 | 153 |
| 0.20 | 26.02 | 144 |
| 0.50 | 25.35 | 141 |

EXAMPLE 4

Experiment was carried out by the same method as example 1 except that the mole fraction of silane coupling agent to styrene was 12.5:87.5. The results are shown in

TABLE 4

| Concentration of the copolymer (wt %) | Flexural strength (MPa) | Adhesion performance improving rate (%) |
|---|---|---|
| 0.025 | 30.17 | 168 |
| 0.050 | 28.08 | 156 |
| 0.10 | 26.48 | 147 |
| 0.20 | 25.30 | 141 |
| 0.50 | 25.11 | 140 |

EXAMPLE 5

Experiment was carried out by the same method as example 1 except that the mole fraction of silane coupling agent to styrene was 17.5:82.5. The results are shown in <Table 5>.

TABLE 5

| Concentration of the copolymer (wt %) | Flexural strength (MPa) | Adhesion performance improving rate (%) |
|---|---|---|
| 0.025 | 27.08 | 150 |
| 0.050 | 26.43 | 147 |
| 0.10 | 26.14 | 145 |
| 0.20 | 25.33 | 141 |
| 0.50 | 24.95 | 135 |

EXAMPLE 6

Experiment was carried out by the same method as example 1 except that the mole fraction of silane coupling agent to styrene was 22.5:77.5. The results are shown in <Table 6>.

TABLE 6

| Concentration of the copolymer (wt %) | Flexural strength (MPa) | Adhesion performance improving rate (%) |
|---|---|---|
| 0.025 | 26.30 | 146 |
| 0.050 | 26.18 | 145 |
| 0.10 | 26.10 | 145 |
| 0.20 | 25.23 | 140 |
| 0.50 | 24.70 | 137 |

As described hereinabove, according to the present invention, the adhesion performance between the fibers and matrix resin is substantially improved, resulting in enhanced the strength and endurance of the composite, thereby solving the difficult problem in the art.

The present invention is not limited to the embodiments described hereinabove. Various modification of disclosed embodiments as well as other embodiments of the present invention will become apparent to persons skilled in the art upon reference to the description of the invention. It is therefore contemplated that the appended claims will cover any such modifications and embodiments as fall within the true scope of the invention.

What is claimed is:

1. In a fiber reinforced polystyrene composite comprising fibers and polystyrene, the improvement comprising an added copolymer having the following general formula:

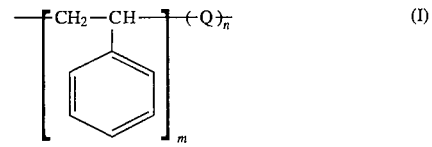

wherein m and n are any natural numbers, and Q is a silane coupling agent copolymerized through a double bond, said copolymer being present in the composite in an amount sufficient to improve adhesion performance between the fibers and the polystyrene.

2. A fiber reinforced polystyrene composite as claimed in claim 1 wherein the fibers comprise fiberglass woven fabrics or fiberglass chips.

3. A fiber reinforced polystyrene composite as claimed in claim 1 wherein said silane coupling agent is present in said copolymer with respect to said styrene in a mole fraction between 1.0:99.0 and 40:60.

4. A fiber reinforced polystyrene composite as claimed in claim 1 wherein the silane coupling agent is γ-MPS.

5. A fiber reinforced polystyrene composite as claimed in claim 1 wherein the copolymer is present in the composite in an amount of between about 0.025 and 0.50 percent by weight.

6. A fiber reinforced polystyrene composite as claimed in claim 1 wherein the silane coupling agent is present in the copolymer with respect to styrene in a mole fraction of between about 2.5:97.5 and 22.5:77.5.

* * * * *